T. W. VARLEY.
SYSTEM OF DISTRIBUTION.
APPLICATION FILED MAY 3, 1912.

1,175,320.

Patented Mar. 14, 1916.
2 SHEETS—SHEET 2.

WITNESSES:
R. J. Ridge.
Otto S. Schairer.

INVENTOR
Thomas W. Varley
BY
Wesley G. Carr
ATTORNEY

UNITED STATES PATENT OFFICE.

THOMAS W. VARLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,175,320.    Specification of Letters Patent.    Patented Mar. 14, 1916.

Application filed May 3, 1912. Serial No. 694,895.

*To all whom it may concern:*

Be it known that I, THOMAS W. VARLEY, a citizen of the United States, and a resident of Pittsburgh, in the county of Allegheny and State of Pennsylvania, have invented a new and useful Improvement in Systems of Distribution, of which the following is a specification.

My invention relates to sytems of electrical distribution, and it has for its object to provide means for transforming three-phase currents into twelve-phase currents, and vice versa.

The invention is of particular value for use in connection with rotary converters and similar machines in which the heating is decreased as the number of phases is increased. Also, since a twelve-phase system involves the use of a large number of leads and brushes for connection to a rotary converter or other similar machine, it is particularly useful where such machines are of large capacity, as the current is distributed among the brushes.

Figure 1:
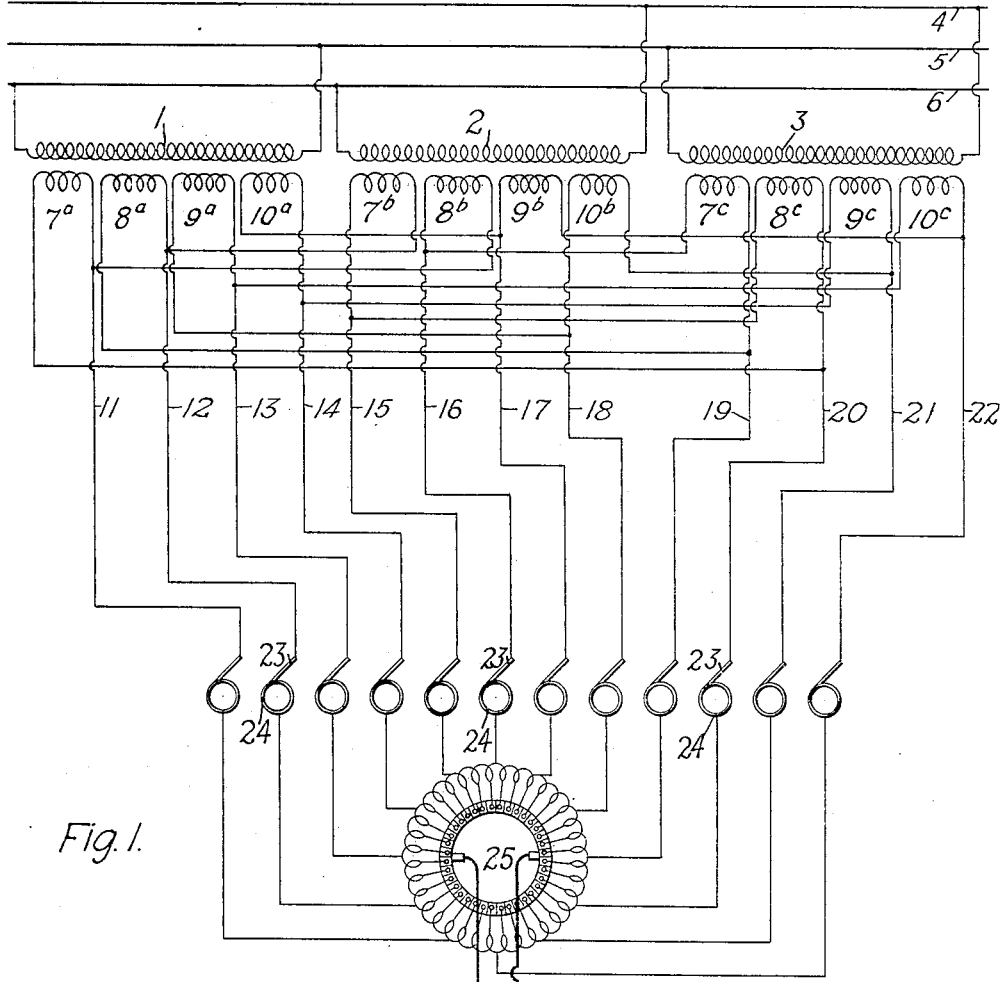
Figure 2:
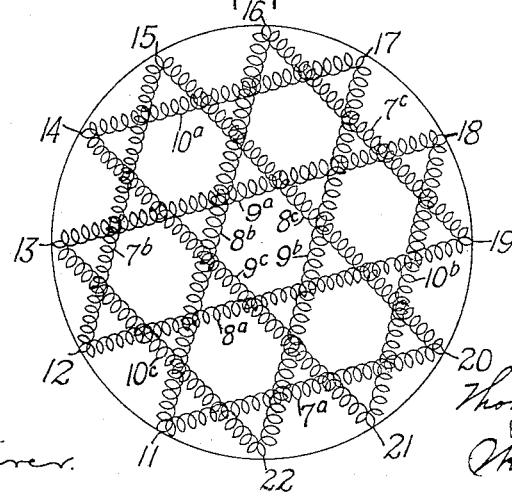
Figure 3:
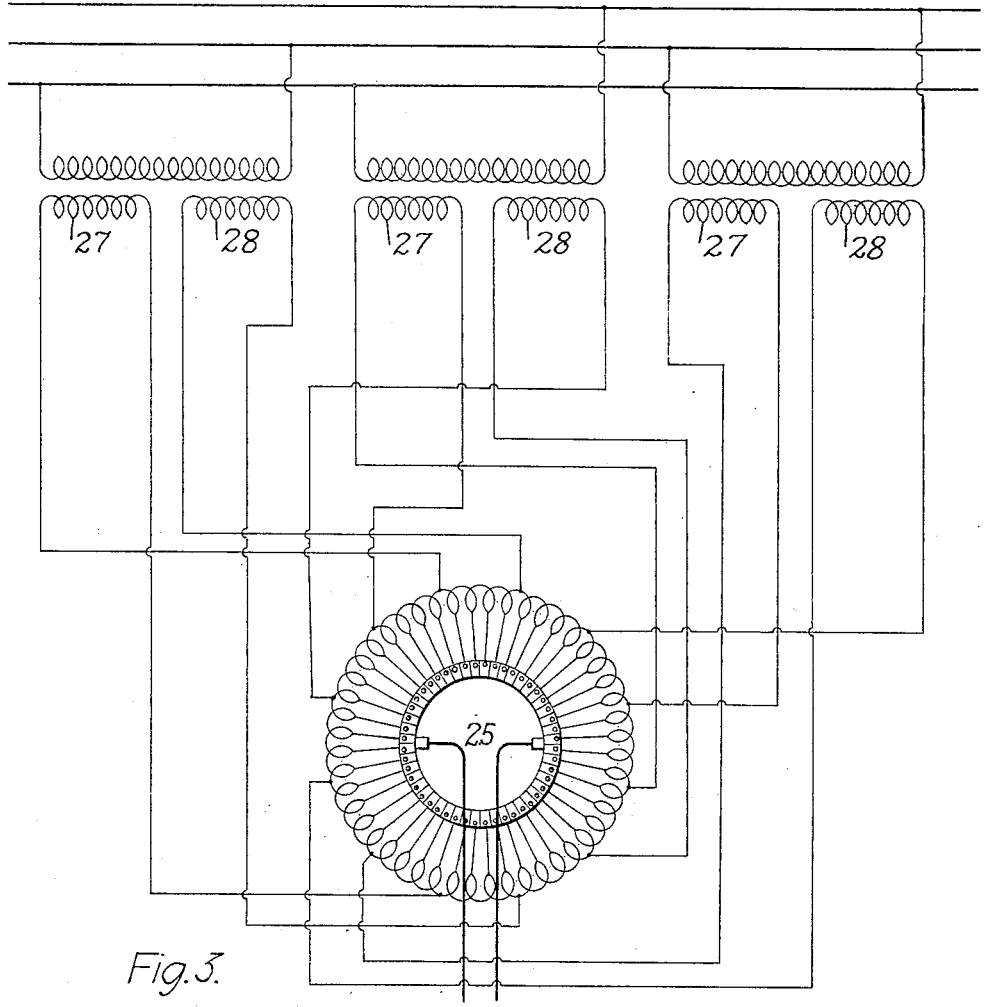
Figure 4:
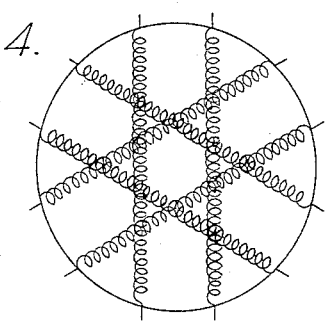

With reference to the accompanying drawing, Figure 1 is a diagrammatic view of a system of distribution embodying my invention, and Fig. 2 is a diagram illustrating, in a simplified manner, the arrangement of the transformer windings of the system illustrated in Fig. 1. Figs. 3 and 4 are views similar respectively to Figs. 1 and 2 illustrating a modification of the present invention.

The system comprises three transformer primary windings 1, 2 and 3, upon which electromotive forces differing 120° in phase are respectively impressed, the said electromotive forces being derived from a distributing circuit 4, 5 and 6. The transformer windings 1, 2 and 3 may be either parts of three separate transformers, or the windings of a single three-phase transformer, as desired. Respectively corresponding to the primary windings 1, 2 and 3, are three sets of secondary windings $7^a$, $8^a$, $9^a$, $10^a$, $7^b$, $8^b$, $9^b$, and $10^b$, and $7^c$, $8^c$, $9^c$, and $10^c$. The windings 7 and 10 of each set are provided with a smaller number of convolutions than the windings 8 and 9, and, accordingly, have lower voltages induced in them. If the currents impressed upon the system are of the sine wave form, the ratio of the number of convolutions in windings 7 and 10 to those in windings 8 and 9 should be as 3 to 4, but if the currents are not of the form of a sine wave, more or less variation from the ratio of 3 to 4 may be necessary in order to obtain the best results, such as uniformity of value of the twelve differently phased electromotive forces.

The connections of the secondary windings of the transformers are shown in both of the figures of the drawings, but most simply and clearly in Fig. 2. The said windings are connected in two groups, each group comprising two secondary windings of each phase and the windings of each group being connected in closed circuit series relation, with the windings of the respective phases alternating with or succeeding each other in the series. In other words, each secondary winding is interposed in the series between two other secondary windings corresponding respectively to the other two phases of the supply system. The arrangement is also such that each short winding is interposed in the series between two long windings, and each long winding is interposed between two of the short windings. As shown in the diagram of Fig. 2, the two series groups of windings appear to be superposed upon, and displaced with respect to each other, and it will be readily seen from the said diagram that twelve phase currents may be obtained by means of the arrangement shown, leads 11 to 22, inclusive, being connected to the junctions of the secondary windings. These leads are preferably connected to brushes 23 bearing upon slip rings 24 of a rotary converter 25, or any other suitable machine, which rings are, in turn, connected to the proper points of the armature winding.

Figs. 3 and 4 illustrate a modification of the system shown in Figs. 1 and 2, which, in some cases, may be preferable thereto by reason of its greater simplicity and economy. In this system, there are only two transformer secondary windings 27 and 28 for each of the three phases of the supply circuit, and all of the said windings have the same number of convolutions. This is often of great advantage, particularly where the system of connections is employed with rotary converters of large capacity and low voltage, because where there is only one ratio of transformation in the transformers, no difficulty is encountered in providing the secondary windings with the proper numbers of convolutions to obtain the desired voltages. This difficulty is sometimes experienced when all of the secondary windings are not the same, but must be adapted to produce different voltages, as in Fig. 1. The secondary windings in Figs. 3 and 4 are connected exactly as in Figs. 1 and 2, with the omission of the short windings. The result is that they are not interconnected at all, but are connected to the armature leads so as to geometrically constitute three pairs of parallel chords to the armature winding, the said chords intersecting at angles of 60° with each other. Similar terminals of each pair of the windings are connected to adjacent armature leads, the terminals of the remaining windings being connected in two groups of leads that intervene between the opposite terminals of the pairs of windings.

I claim as my invention:—

1. The combination of three sets of transformer windings upon which three-phase electromotive forces are respectively impressed, each of said sets comprising four windings, the convolutions in two of which are in the ratio of 3 to 4 to the convolutions in the other two, the said sets of windings being connected in two closed series groups comprising one short and one long winding of each set, and the short and long windings alternating in position in the groups, and leads connected to the several junctions of the windings.

2. The combination of three sets of transformer windings upon which three-phase electromotive forces are respectively impressed, the said windings being connected in two closed series groups comprising two windings of each set with the windings of each phase interposed between those of the other phases, and leads connected to the several junctions of the windings.

3. The combination with a plurality of sets of transformer windings upon which electromotive forces of one number of phases are impressed, each of said sets comprising windings of an unlike number of convolutions, the said windings being connected in a closed-series group in which the windings having the smaller number of convolutions alternate in position with the windings having the larger number of convolutions, and leads for the distribution of polyphase currents of another number of phases connected to the several junctions of the windings.

4. The combination with a plurality of sets of transformer windings upon which electromotive forces of one number of phases are impressed, each of said sets comprising windings of an unlike number of convolutions, the said windings being connected in a plurality of closed-series groups comprising windings of alternate phases and in which the windings having the smaller number of convolutions alternate in position with the windings having the larger number of convolutions, and leads for the distribution of polyphase currents of another number of phases connected to the several junctions of the windings.

In testimony whereof, I have hereunto subscribed my name this 12th day of April, 1912.

THOMAS W. VARLEY.

Witnesses:
 OTTO S. SCHAIRER,
 B. B. HINES.

Copies of this patent may be obtained for five cents each, by addressing the "Commissioner of Patents, Washington, D. C."